United States Patent
Uhlenbruch et al.

(10) Patent No.: US 8,801,080 B2
(45) Date of Patent: Aug. 12, 2014

(54) CRASH STRUCTURE FOR ATTACHMENT TO A FRONT SUBFRAME FOR A MOTOR VEHICLE

(75) Inventors: Lutz Uhlenbruch, Herbstein (DE); Oliver Eichelhard, Frankfurt (DE)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 13/474,961

(22) Filed: May 18, 2012

(65) Prior Publication Data
US 2012/0292946 A1 Nov. 22, 2012

(30) Foreign Application Priority Data
May 20, 2011 (DE) .................. 10 2011 102 116

(51) Int. Cl.
*B60R 19/34* (2006.01)

(52) U.S. Cl.
USPC .................. 296/187.09; 296/203.02

(58) Field of Classification Search
CPC .............. B62D 21/152; B62D 21/15
USPC ............. 296/203.02, 187.09, 187.1, 204; 280/784, 785, 124.109
See application file for complete search history.

(56) References Cited

U.S. PATENT DOCUMENTS

| | | | |
|---|---|---|---|
| 3,912,295 A * | 10/1975 | Eggert, Jr. .................. 280/784 |
| 5,803,514 A * | 9/1998 | Shibuya et al. .................. 293/133 |
| 6,619,730 B2 | 9/2003 | Pörner | |
| 6,843,524 B2 | 1/2005 | Kitagawa | |
| 6,923,484 B2 | 8/2005 | Braun et al. | |
| 7,213,873 B2 | 5/2007 | Murata et al. | |
| 7,252,326 B2 | 8/2007 | Wada | |
| 7,810,878 B2 | 10/2010 | Nakamura et al. | |
| 7,815,245 B2 | 10/2010 | Hiraishi et al. | |
| 7,883,113 B2 * | 2/2011 | Yatsuda .................. 280/784 |
| 7,900,984 B2 * | 3/2011 | Tan et al. .................. 293/155 |
| 7,926,868 B2 * | 4/2011 | Braunbeck et al. ...... 296/187.03 |

FOREIGN PATENT DOCUMENTS

| | | |
|---|---|---|
| DE | 19532531 A1 | 3/1997 |
| DE | 19803385 A1 | 8/1999 |
| DE | 19959607 A1 | 6/2001 |
| DE | 10026393 A1 | 11/2001 |
| DE | 10042562 A1 | 3/2002 |
| DE | 10163220 A1 | 7/2003 |
| DE | 10302534 A1 | 9/2004 |
| DE | 102005055978 A1 | 5/2007 |
| DE | 102006013547 A1 | 9/2007 |
| DE | 102006013550 A1 | 9/2007 |
| DE | 102008039138 A1 | 3/2009 |
| DE | 102008019593 A1 | 10/2009 |
| EP | 0926048 A2 | 6/1999 |
| EP | 1184261 A1 | 3/2002 |
| GB | 2090795 A | 7/1982 |

OTHER PUBLICATIONS

German Patent Office, German Search Report for Application No. 102011102116.0, dated Jan. 25, 2012.

\* cited by examiner

*Primary Examiner* — Joseph Pape
(74) *Attorney, Agent, or Firm* — Ingrassia Fisher & Lorenz, P.C.

(57) ABSTRACT

A crash structure for attachment to a front subframe for a motor vehicle is provided. The crash structure includes an attachment area and a stiffening structure that reinforces the crash structure in the attachment area for the front subframe. The stiffening structure connects the crash structure to the front subframe in a friction-locked and/or formfitting manner.

16 Claims, 2 Drawing Sheets

CRASH STRUCTURE FOR ATTACHMENT TO A FRONT SUBFRAME FOR A MOTOR VEHICLE

CROSS-REFERENCE TO RELATED APPLICATION

This application claims priority to German Patent Application No. 10 2011 102 116.0, filed May 20, 2011, which is incorporated herein by reference in its entirety.

TECHNICAL FIELD

The technical field relates to a crash structure for attachment to a front subframe for a motor vehicle. Furthermore, the technical field relates to a front subframe, in particular a front axle subframe, for a motor vehicle.

BACKGROUND

Motor vehicles typically have a so-called front subframe or front axle subframe in the front end, which supports, inter alia, the steering gear, the stabilizer, the engine mount, the wishbone, and the exhaust system of the motor vehicle. A crash structure adjoins the front subframe in each case on the left longitudinal side and on the right longitudinal side of the front subframe, viewed in the vehicle direction, the crash structures also being designated as crash extensions. The crash structures are implemented like a longitudinal girder and are to absorb impact energy in case of a crash of the motor vehicle. For this purpose, the crash structures are implemented in such a manner that they deform in case of a crash to absorb impact energy. The crash structures typically have an oblong contour in such a manner that, in the event of an impact force acting essentially frontally on the motor vehicle, compression of the crash structure occurs in the direction of the vehicle longitudinal axis.

The crash structures are typically screwed together with the front subframe. For this purpose, on each crash structure, at least one screw element is guided through the front subframe in the vehicle longitudinal direction and screwed together with the front side of the crash structure in each case. It has been shown that in the case of such a connection of crash structure and front subframe, the front end structure thus formed has a tendency, in the event of lateral forces acting in the vehicle transverse direction on the front subframe, for example, to act via the front wishbone on the wishbone attachment points of the front subframe during the travel of the motor vehicle, promoting sagging in the attachment area between the crash structure and the front subframe. Due to the sagging in the attachment area, a location change of the wishbone attachment points in the area of the front subframe occurs, which unfavorably influences the steering behavior of the motor vehicle. The front wishbone attachment points are typically also designated as handling bushes, A bushes, or wishbone bushes.

At least one object herein is to provide a crash structure for attachment to a front subframe for a motor vehicle having the features mentioned at the beginning, by which a location change of the front subframe in the area of its wishbone attachment points, in particular upon the action of lateral forces, is prevented. Furthermore, a front subframe is proposed which is suitable for the attachment of such a crash structure. In addition, other objects, desirable features and characteristics will become apparent from the subsequent summary and detailed description, and the appended claims, taken in conjunction with the accompanying drawings and this background

SUMMARY

In accordance with an exemplary embodiment, a crash structure for attachment to a front subframe for a motor vehicle is provided. The crash structure has a stiffening structure, which reinforces the crash structure in an attachment area for the front subframe, and at which the crash structure is connectable to the front subframe in a friction-locked and/or formfitting manner.

A stiffened connection between the crash structure and the front subframe is achieved at least in the attachment area of the crash structure by the reinforcement of the crash structure in the attachment area on the front subframe. Through this reinforcement of the attachment area, any possible location changes of the front subframe because of lateral forces acting on the front subframe, as occur in driving operation of the motor vehicle, for example, are effectively counteracted. The front subframe is thus stabilized in its location, so that even upon the occurrence of lateral forces on the front subframe in operation of the motor vehicle, any possible location change in the area of the wishbone attachment points of the front subframe is decreased. The measure therefore has a stiffening effect on the entire front subframe, in particular on the wishbone attachment points of the front subframe.

A stiffening of crash structure and front subframe also results in order to be able to tolerate torques and/or bending torques which occur in driving operation of the motor vehicle in the crash structure or the front subframe better than previously. Through the friction-locked or formfitting attachment of the crash structure to the front subframe, it is also possible to attach crash structures of different material types to the same front subframe, since the stiffness in the attachment area between crash structure and front subframe is achieved by the stiffening structure.

A detachable connection also can be implemented by the friction-locked or formfitting connection of the crash structure to the front subframe, so that a replacement of a crash structure, which is possibly deformed during an impact, with a new crash structure is readily possible.

According to an embodiment, the crash structure is oblong and preferably the stiffening structure extends over a predefined length in the longitudinal direction of the crash structure. The stiffened or reinforced attachment area of the crash structure is thus settable flexibly in a simple manner by the stiffening structure. Depending on the length of the stiffening structure, the crash structure is therefore implemented as more or less stiffening or reinforcing in its longitudinal direction.

According to a further embodiment, the crash structure has a hollow profile and the stiffening structure is arranged at least partially inside the hollow profile. A particularly strong bond between the stiffening structure and the crash structure is thus implemented, since the stiffening structure is at least partially enclosed by the crash structure and therefore a strong connection between the crash structure and the stiffening structure accommodated therein can be implemented in a simple and stable manner.

The crash structure is producible in a particularly simple manner if the crash structure has a closed hollow profile, for example, a tubular hollow profile, in the periphery. The stiffening structure can be accommodated particularly simply therein, in that, for example, the stiffening structure is inserted into the tubular hollow profile. A particularly strong bond between the walls of the crash structure and the stiffening structure is also thus implementable.

According to one embodiment, the stiffening structure is strongly connected to the crash structure, in particular strongly connected to the crash structure by means of thermal joining methods. A permanent connection between the stiffening structure and the walls of the crash structure is thus implemented in a simple manner. For example, the stiffening structure can be welded onto the walls of the crash structure. In an alternative embodiment, the stiffening structure is removably connected to the walls of the crash structure.

According to another embodiment, the stiffening structure is arranged on a section of the crash structure extending substantially linearly in the longitudinal direction of the crash structure. The stiffening structure is thus implementable in a simple geometric form, which is attachable to the linear section. The attachment to the front subframe is also thus implementable in a technically simple manner, since the front subframe has a corresponding wall section provided in simple geometry for this purpose, which is to be placed in an active position on the stiffening structure arranged on the linear section of the crash structure.

According to an embodiment, the stiffening structure is screwed together with the front subframe. The crash structure connected to the stiffening structure can thus be removed from the front subframe and also reinstalled thereon in a technically particularly simple manner. It is thus also possible in a simple manner with respect to installation to replace a crash structure deformed after a crash with a new crash structure. Screwing together the stiffening structure with the front subframe is possible with little installation effort and therefore promotes subsequent replacement of the crash structure, for example, in repair shops.

In an embodiment, the stiffening structure has a plate-shaped element, which can be placed in an active position having its essentially planar surface abutting a wall of the front subframe. The plate-shaped element is to be understood as a substantially planar component, which has a high resistance force against forces acting perpendicularly to the planar component and/or bending torques around the plane axis and can be loaded with high forces or bending torques of this type, without damage to the component occurring.

In that the stiffening structure has the plate-shaped element, which can be placed in an active position having its planar surface abutting a wall of the front subframe, a particularly strong connection between the crash structure or the stiffening structure connected thereon and the front subframe is producible in a technically simple manner.

It is expedient for the stiffening structure to have a further plate-shaped element, which is spaced apart from the plate-shaped element, in particular arranged spaced apart essentially parallel thereto. The stiffening or reinforcement effect of the stiffening structure is thus increased, because more than one plate-shaped element is provided in the attachment area of the crash structure, which has a stiffening effect in regard to the attachment area of the crash structure and therefore indirectly has a stiffening or reinforcing effect on the front subframe, so that components, for example, the wishbone attachment points of the front subframe, remain substantially unchanged in their location even upon the action of high forces, in particular lateral forces, in operation or driving operation of the motor vehicle.

A particularly strong bond of the parts forming the stiffening structure is achieved in that the plate-shaped element and the further plate-shaped element are solidly connected to one another via an intermediate element.

A durably strong composite structure for the stiffening structure is particularly implemented if, preferably, the intermediate element is connected to the plate-shaped element and the further plate-shaped element by thermal joining methods. For this purpose, the intermediate element can be connected to the plate-shaped element and the further plate-shaped element by welding and/or soldering.

In a further embodiment, the intermediate element has a passage opening for guiding through a connection element, by means of which the crash structure is fixable, in particular is fixed, on the front subframe. An attachment of the crash structure on the front subframe using the stiffening structure is thus implementable or implemented in a technically simple manner.

One possible attachment of the crash structure to the front subframe using the connection element can be implemented, for example, in that the connection element is a screw element and a nut, in particular a weld nut, is fixed on the plate-shaped element or the further plate-shaped element, into which the connection element can be screwed while fixing the crash structure on the front subframe.

Alternatively, it can also be provided in the case of a connection element implemented as a screw element that the intermediate element, the plate-shaped element, or the further plate-shaped element has a thread-bearing section, into which the connection element can be screwed while fixing the crash structure on the front subframe.

In an embodiment, the intermediate element is a sleeve. A geometrically simple component can thus be used, which is available in standardized sizes in a great manifold on the market and is therefore particularly cost-effective.

The stiffening structure is implemented by the plate-shaped element and the further plate-shaped element, which are connected to one another by the intermediate element, for example in the nature of a sleeve, according to an embodiment. The sleeve is preferably welded onto the plate-shaped element and the further plate-shaped element. Furthermore, the plate-shaped element and the further plate-shaped element are each attached, in particular welded, on a wall, in particular an outer wall of the crash structure implemented as a hollow profile. A particularly stable stiffening structure is formed by the welding. Furthermore, a particularly strong connection of the stiffening structure to the crash structure is implemented by the welding of the stiffening structure on the crash structure.

A front subframe, in particular a front axle subframe, for a motor vehicle, on which at least one crash structure of the above-described type is fixed, is provided. According to an exemplary embodiment, the front subframe is implemented as U-shaped, a crash structure of the above-described type being fixed by means of a connection element on the ends of each of the legs thereof.

According to still another embodiment, the front subframe, in the attachment area to the crash structure, has an outwardly open cavity, into which a connection element for threading into a passage opening of a wall of the front subframe can be introduced for fixing the crash structure on the front subframe. The assembly of front subframe and crash structure by means of the connection element is thus made easier, since a cavity is provided, in which the connection element can already be held in the direction in which the connection element can then be inserted into the passage opening without more extensive alignment, to produce a strong connection to the crash structure using the stiffening structure.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof Furthermore, there is no intention to be bound by any theory presented in the preceding background or the following detailed description.

Figure 1:
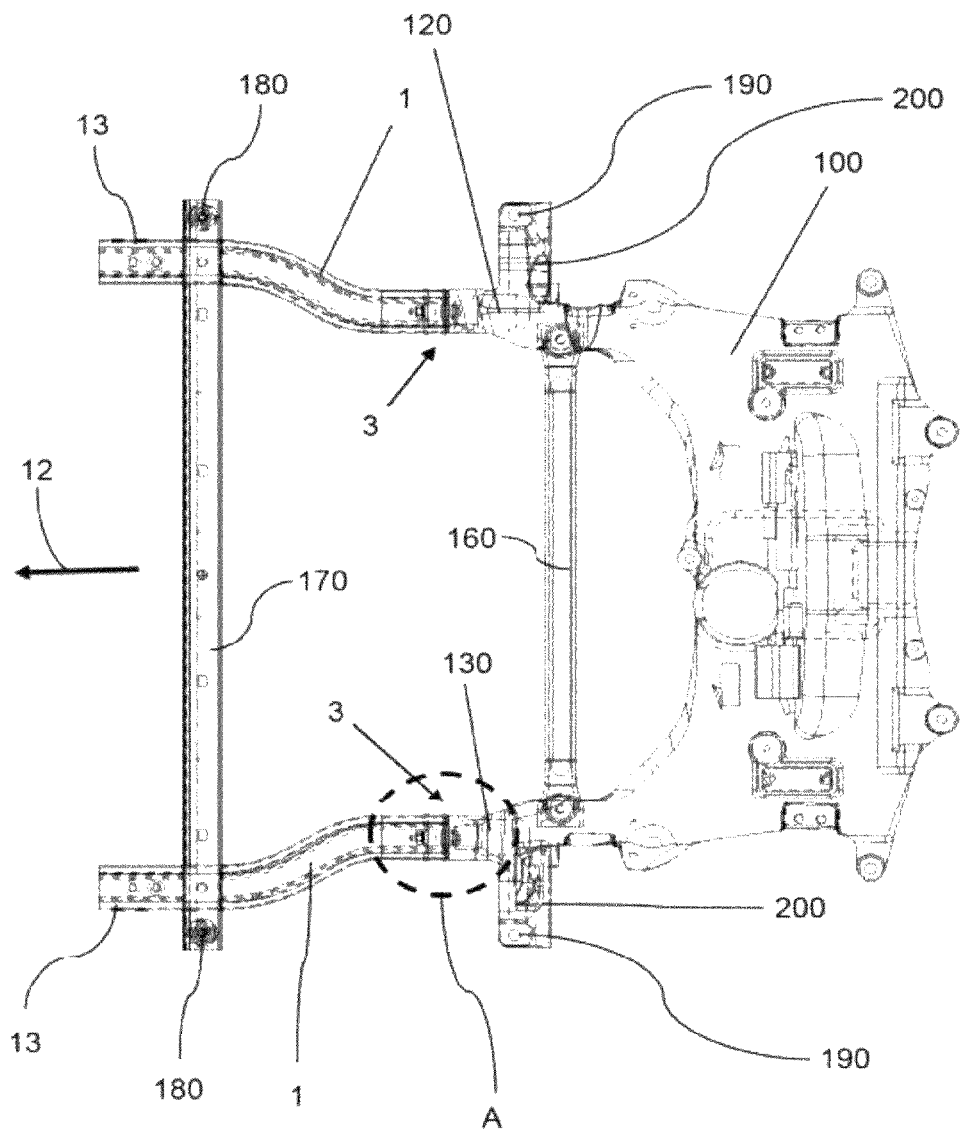
FIG. 1 shows a possible embodiment of a front subframe having possible embodiments of crash structures arranged on the left and right sides thereof in a top view.

FIG. 1 shows an embodiment of a front subframe 100, in particular a front axle subframe. The front subframe 100 is preferably implemented as U-shaped, an embodiment of a crash structure 1 being fixed on the ends of each of the legs 120, 130 thereof.

For example, the front subframe 100 is used for the purpose of supporting the steering gear of the vehicle steering system, at least one stabilizer, at least one bearing for the engine mount, the wishbone, and the exhaust system of the motor vehicle. A tie bar 160 is preferably assigned or coupled to the front subframe 100, by which the two legs 120, 130 of the front subframe 100 are connected to one another. The tie bar 160 is preferably linked to the legs 120, 130 and is used to improve the stiffness of the front subframe 100 in the area of its legs 120 and 130.

Two crash structures 1 respectively adjoining the ends of the legs 120, 130 of the front subframe 100 are preferably implemented as oblong and have an S-shaped longitudinal contour extending essentially in the travel direction 12. The respective crash structures 1 are preferably also implemented as essentially S-shaped in the Z direction, i.e., in the vertical direction of the motor vehicle (not shown in FIG. 1). The crash structures 1 can thus absorb impact energy in the event of a crash through compression or another type of deformation.

The crash structures 1 arranged on the legs 120, 130 of the front subframe 100 are, viewed in the travel direction 12, connected to one another on their respective end area by crossbeam 170. Crossbeam 170 preferably has an attachment point 180 on both sides on its longitudinal-side ends, in order to attach the crossbeam 170 to the subfloor (not shown in FIG. 1) or the vehicle body (not shown in FIG. 1) of the motor vehicle.

Furthermore, a projection 200, which respectively protrudes outward transversely to the travel direction 12, in particular in the vehicle transverse direction, is provided on the legs 120, 130 of the front subframe 100. Each of the projections has an attachment point 190. The front subframe 100 is attachable to the subfloor, in particular of the vehicle body of the motor vehicle, at the attachment point 190.

The crash structures 1 have an attachment point 13 on each of their free ends protruding in the travel direction 12, in order to preferably be able to fasten the radiator of the engine of the motor vehicle thereon.

The crash structures 1 are each screwed onto the front subframe 100.

Figure 2:
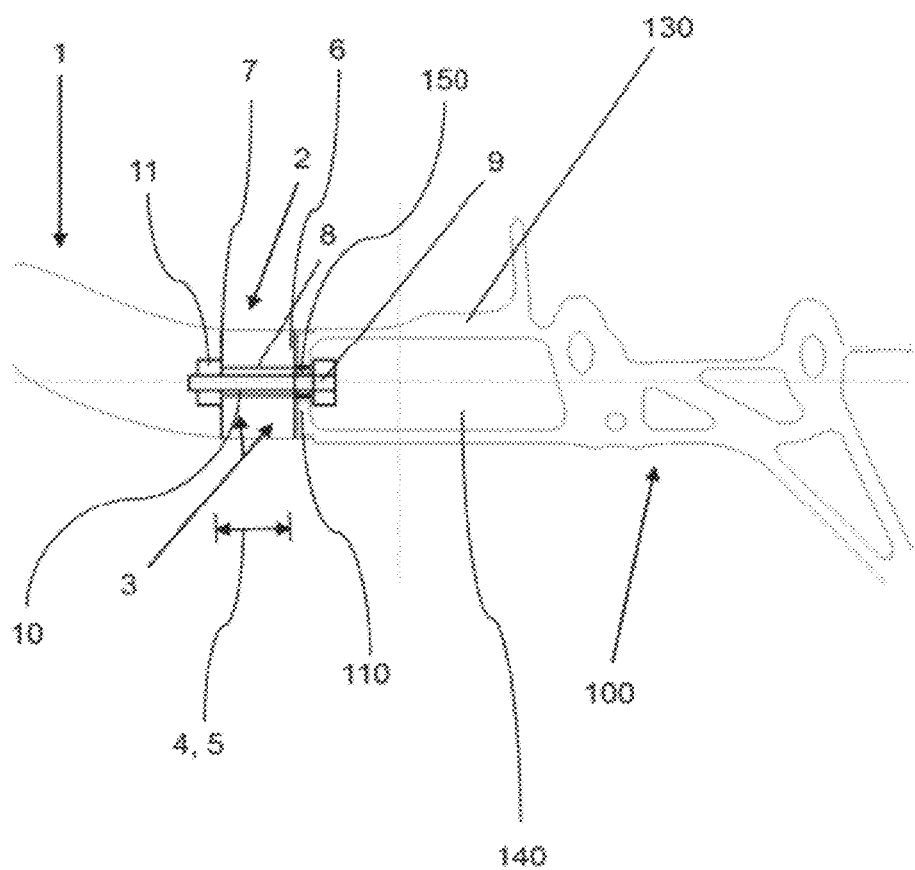
FIG. 2 shows a detail of FIG. 1 in the area of attachment of one of the crash structures to the front subframe in a bottom view.

FIG. 2 shows the way in which the crash structures 1 are attached to the front subframe 100 on the basis of the example of detail A according to FIG. 1, which shows the attachment of the crash structure 1 on the leg 130 of the front subframe 100 in a detail as a bottom view.

As shown in FIG. 2, the crash structure 1 has a stiffening structure 3 in an attachment area 2. The stiffening structure 3 is used for attaching the crash structure 1 to the leg 130 of the front subframe 100. The crash structure 1 is solidly connected at the stiffening structure 3 to the front subframe 100 by means of a connection element 9, for example, in the nature of a screw element.

The stiffening structure 3 is preferably arranged for this purpose on a section 5 of the crash structure 1, which is implemented as substantially linear. The linear section 5 preferably forms a predefined length 4 in the longitudinal direction of the crash structure 1, over which the stiffening structure 3 extends.

The crash structure 1 is preferably implemented as a hollow profile, in particular a tubular hollow profile, the stiffening structure 3 being arranged inside the hollow profile.

Furthermore, as shown in FIG. 2, the stiffening structure 3 is formed by a plate-shaped element 6 and a further plate-shaped element 7, which is spaced apart substantially parallel to the plate-shaped element 6, and an intermediate element 8, which connects the plate-shaped elements 6 and 7 to one another. The plate-shaped element 6 is placed in an active position having its substantially planar surface abutting a wall 110, in particular a front wall, of the front subframe 100.

The intermediate element 8 is connected to the two plate-shaped elements 6 and 7 by means of welding. The intermediate element 8 is preferably implemented as a sleeve, whose passage opening 10 forms a passage for guiding through the connection element 9.

The two plate-shaped elements 6 and 7 are preferably fixed on the outer wall of the crash structure 1 by means of welding. In this regard, a strong composite structure for stiffening the crash structure 1 in the attachment area 2 is implemented by the plate-shaped elements 6 and 7 welded onto the crash structure 1 and the interposed intermediate element 8 or sleeve, which is welded onto the plate-shaped elements 6 and 7.

A nut, preferably a weld nut 11, is preferably arranged on the plate-shaped element 7, preferably on the side facing away from the leg 130. The nut is welded onto the plate-shaped element 7 and is used to accommodate or screw in the connection element 9.

The leg 130 preferably has a cavity 140, which opens outward and into which the connection element 9 can be introduced for threading into a passage opening 150 of the wall 110 of the front subframe 100 to fix the crash structure 1 on the front subframe 100. The connection element 9, which is preferably implemented as a screw element, can thus be inserted in a simple manner into the passage opening 10 and through the sleeve or the intermediate element 8 and screwed into the nut 11, so that a strong screw connection is thus produced between the front subframe 100 and the crash structure 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A crash structure for attachment to a front subframe for a motor vehicle, wherein the crash structure has a hollow profile, and wherein the crash structure comprises:
   an attachment area; and
   a stiffening structure that is at least partially arranged inside the hollow profile and that reinforces the crash structure in the attachment area, the stiffening structure comprising:
      an intermediate element having a passage opening, wherein the intermediate element is located between the crash structure and the front subframe; and
      a connection element that passes through the passage opening of the intermediate element, wherein the connection element extends in a longitudinal direction of the crash structure, and connects the crash structure to the front subframe in a friction-locked manner;
      a first plate-shaped element that is placed in an active position having its substantially planar surface abutting a wall of the front subframe; and
      a second plate-shaped element permanently connected to the first plate-shaped element via the intermediate element, wherein the second plate-shaped element is arranged substantially parallel to and spaced apart from the first plate-shaped element.

2. The crash structure according to claim 1, wherein the crash structure is oblong and the stiffening structure extends over a predefined length in the longitudinal direction of the crash structure.

3. The crash structure according to claim 1, wherein the stiffening structure is solidly connected to the crash structure.

4. The crash structure according to claim 3, wherein the stiffening structure is solidly connected to the crash structure by thermal joining methods.

5. The crash structure according to claim 1, wherein the stiffening structure is arranged on a section of the crash structure extending substantially linearly in the longitudinal direction of the crash structure.

6. The crash structure according to claim 1, wherein the stiffening structure is implemented to be screwed together with the front subframe.

7. The crash structure according to claim 1, wherein the intermediate element is connected to the plate-shaped element and the further plate-shaped element by thermal joining methods.

8. The crash structure according to claim 1, wherein the crash structure is fixable on the front subframe via the connection element.

9. The crash structure according to claim 8, wherein the connection element is a screw element, wherein a nut is fixed on the plate-shaped element or the further plate-shaped element, and wherein the screw element can be screwed into the nut while fixing the crash structure on the front subframe.

10. The crash structure according to claim 9, wherein the nut is a weld nut.

11. The crash structure according to claim 8, wherein the connection element is a screw element and wherein the intermediate element, the plate-shaped element, or the further plate-shaped element has a thread-bearing section into which the screw element is screwed while fixing the crash structure on the front subframe.

12. A front subframe for a motor vehicle, the front subframe comprising:
   a first leg;
   a second leg; and
   a crash structure fixed to the first leg and the second leg, wherein the crash structure has a hollow profile, and wherein the crash structure comprises:
      an attachment area; and
      a stiffening structure that is at least partially arranged inside the hollow profile and that reinforces the crash structure in the attachment area, the stiffening structure comprising:
         an intermediate element having a passage opening, wherein the intermediate element is located between the crash structure and the front subframe; and
         a connection element that passes through the passage opening of the intermediate element, wherein the connection element extends in a longitudinal direction of the crash structure, and connects the crash structure to the front subframe in a friction-locked-manner;
         a first plate-shaped element that is placed in an active position having its substantially planar surface abutting a wall of the front subframe; and
         a second plate-shaped element permanently connected to the first plate-shaped element via the intermediate element, wherein the second plate-shaped element is arranged substantially parallel to and spaced apart from the first plate-shaped element.

13. The front subframe of claim 12, wherein the front subframe is a front axle subframe.

14. The front subframe according to claim 12, wherein the connection element is a first connection element, and wherein the front subframe is U-shaped and the crash structure is fixed on ends of the first leg and the second leg by the first connection element and a second connection element, respectively.

15. The crash structure according to claim 14, wherein the front subframe has a cavity that is outwardly open and into which the first connection element for threading into a passage opening of a wall of the front subframe is introduced for fixing the crash structure on the front subframe.

16. The crash structure according to claim 1, wherein the connection element extends completely through the stiffening structure and the intermediate element of the stiffening structure.

* * * * *